(12) United States Patent
Byrne

(10) Patent No.: US 6,883,010 B2
(45) Date of Patent: Apr. 19, 2005

(54) FACILITATING FAILOVER TO A SECONDARY FILE SERVER IN A HIGHLY AVAILABLE FILE SYSTEM

(75) Inventor: Michael J. Byrne, Wicklow (IE)

(73) Assignee: Sun Microsystems, Inc., Santa Clara, CA (US)

(*) Notice: Subject to any disclaimer, the term of this patent is extended or adjusted under 35 U.S.C. 154(b) by 437 days.

(21) Appl. No.: 10/146,104

(22) Filed: May 14, 2002

(65) Prior Publication Data

US 2003/0217030 A1 Nov. 20, 2003

(51) Int. Cl.$^7$ ............................................. G06F 17/30
(52) U.S. Cl. ............................................. 707/203; 707/10
(58) Field of Search .................... 707/1–10, 100–104.1, 707/200–205; 709/223

(56) References Cited

U.S. PATENT DOCUMENTS 5,893,086 A * 4/1999 Schmuck et al. ............... 707/1
6,085,238 A * 7/2000 Yuasa et al. ................ 709/223
6,601,070 B1 * 7/2003 Zhang et al. .................. 707/8

\* cited by examiner

*Primary Examiner*—Mohammed Ali
(74) *Attorney, Agent, or Firm*—Park, Vaughan & Fleming LLP (57) ABSTRACT

One embodiment of the present invention provides a system for elevating a secondary file server to act as a new primary file server in a highly available file system. Upon determining that a primary file server in the highly available file system has failed, the system promotes the secondary file server to become the new primary file server. During this process, the new primary file server scans file objects to look for a file lock indication. Upon finding a file lock indication, the new primary file server converts an associated file identifier into a virtual node. Otherwise, conversion of file identifiers into virtual nodes is delayed until the first time a file is subsequently accessed by the new primary server, thereby speeding up the failover process.

21 Claims, 6 Drawing Sheets

FACILITATING FAILOVER TO A SECONDARY FILE SERVER IN A HIGHLY AVAILABLE FILE SYSTEM

BACKGROUND

1. Field of the Invention

The present invention relates to highly available file systems. More specifically, the present invention relates to a method and apparatus for facilitating a failover to a secondary file server upon failure of a primary file server in a highly available file system.

2. Related Art

Highly available file systems allow a client to continue accessing files from a storage device when a primary file server for the storage device fails or otherwise becomes inaccessible. Highly available file systems typically make use of multiple file servers that are coupled to one or more multi-ported storage devices. During operation, one file server is designated as the primary file server. This primary file server services all requests to access files on the storage device. The other file servers act as backup secondary file servers, which do not normally access the storage device. The primary file server periodically sends checkpoint information to the secondary file servers. This allows the secondary file servers to maintain copies of state information from the primary file server.

When the primary file server subsequently fails or otherwise becomes inaccessible, a secondary file server is promoted to act as a new primary file server. This process of promoting a secondary file server to act as a new primary file server is referred to as a "failover." Promoting the secondary file server allows operations in progress to complete or to be automatically retried.

In some operating systems, a primary file server maintains file objects, which contain a pointer to a virtual node (vnode). A vnode holds state information that is used to access the file on the underlying file system. The secondary file server also maintains file objects. However, instead of including pointers to vnodes, these file objects include pointers to file identifiers (FIDs). FIDs can be used to identify a file on the storage device. However, an FID must first be converted to a vnode before the file can be accessed.

Hence, during a failover operation, the new primary file server must convert FIDs to vnodes. This can be an extremely slow process because a large number of FIDs may have to be converted to vnodes, and furthermore, each conversion may require an access to the storage device. During this conversion process, the new primary file server cannot accept new file requests. This can cause long waits for client applications that need to access the file system, which result in timeouts or other failures.

What is needed is a method and an apparatus that facilitates failover to a secondary file server in a highly available file system without the problems described above.

SUMMARY

One embodiment of the present invention provides a system for elevating a secondary file server to act as a new primary file server in a highly available file system. Upon determining that a primary file server in the highly available file system has failed, the system promotes the secondary file server to become the new primary file server. During this process, the new primary file server scans file objects to look for a file lock indication. Upon finding a file lock indication, the new primary file server converts an associated file identifier into a virtual node. Otherwise, conversion of file identifiers into virtual nodes is delayed until the first time a file is subsequently accessed by the new primary server, thereby speeding up the failover process.

In one embodiment of the present invention, the file lock indication is stored within a file object referenced by a list of file objects.

In one embodiment of the present invention, the system converts a file identifier into a corresponding virtual node during a subsequent access to the file object by the new primary file server.

In one embodiment of the present invention, converting the associated file identifier into the virtual node involves locating a file referenced by the associated file identifier and reading the file.

In one embodiment of the present invention, the system periodically sends a checkpoint from the primary file server to the secondary file server.

In one embodiment of the present invention, the checkpoint includes the file identifier associated with the virtual node.

In one embodiment of the present invention, a checkpoint is sent for each state change at the primary file server.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Highly Available File System

Figure 1A:
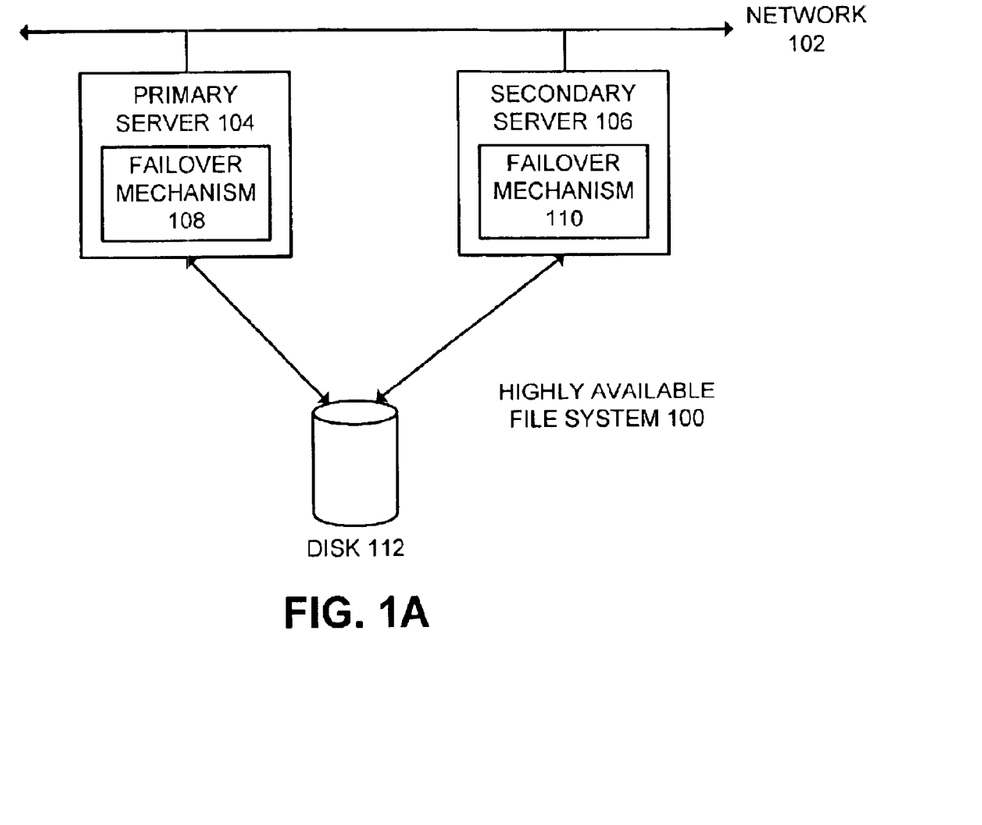
FIG. 1A illustrates highly available file system 100 in accordance with an embodiment of the present invention.

FIG. 1A illustrates highly available file system 100 in accordance with an embodiment of the present invention. Highly available file system 100 includes primary server 104 and secondary server 106. Primary server 104 and secondary server 106 can generally include any nodes on a computer network including a mechanism for servicing requests from a client for computational and/or data storage resources. Note that highly available file system 100 may include more than one secondary server.

Primary server 104 and secondary server 106 are coupled to disk 112. Disk 112 can include any type of system for storing data in non-volatile storage. This includes, but is not limited to, systems based upon magnetic, optical, and magneto-optical storage devices, as well as storage devices based on flash memory and/or battery-backed up memory. Disk 112 can include a redundant array of inexpensive (or independent) disks (RAID) system. Moreover, disk 112 includes multiple ports for communicating with file servers. Note that disk 112 may include more than the two ports shown in FIG. 1A.

Primary server 104 and secondary server 106 include failover mechanisms 108 and 110, respectively. Failover mechanisms 108 and 110 form a distributed management system for disk 112, which operates as described below.

Primary server 104 and secondary server 106 are also coupled to network 102. Network 102 can generally include any type of wire or wireless communication channel capable of coupling together computing nodes. This includes, but is not limited to, a local area network, a wide area network, or a combination of networks. In one embodiment of the present invention, network 102 includes the Internet.

Failover Mechanisms

Figure 1B:
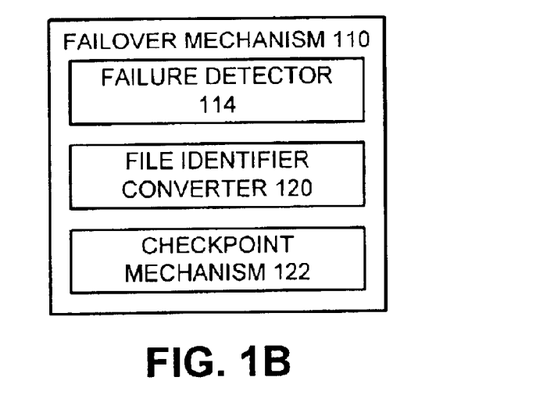
FIG. 1B illustrates failover mechanism 110 in accordance with an embodiment of the present invention.

FIG. 1B illustrates the structure of failover mechanism 110 in accordance with an embodiment of the present invention. Failover mechanism 110 includes failure detector 114, file identifier converter 120, and checkpoint mechanism 122.

Failure detector 114 operates in conjunction with the corresponding failure detectors in other servers to detect when primary server 104 fails. Techniques for detecting failure of primary file server 104 are know in the art and will not be discussed further herein. Upon detecting failure of primary server 104, failover mechanism 110 promotes secondary server 106 to be the new primary server.

After secondary server 106 has been promoted to be the new primary server, failover mechanism 110 scans a file object list as described below in conjunction with FIGS. 3 and 5 to determine if the associated file object includes a lock indication. A file objects that includes a lock indication has its file identifier immediately converted into a virtual node (vnode). In contrast, a file object without a lock indication delays having its file indicator converted into a vnode until the associated file is subsequently accessed.

Checkpoint mechanism 122 within primary server 104 sends checkpoints to a corresponding checkpoint mechanism 122 within secondary server 106 so that secondary server 106 is aware of file operations in progress within primary server 104. These checkpoints include a file identifier (FID) for each file in use by primary server 104. Note that primary server 104 maintains a vnode for each file rather than an FID.

Checkpointing

Figure 2A:
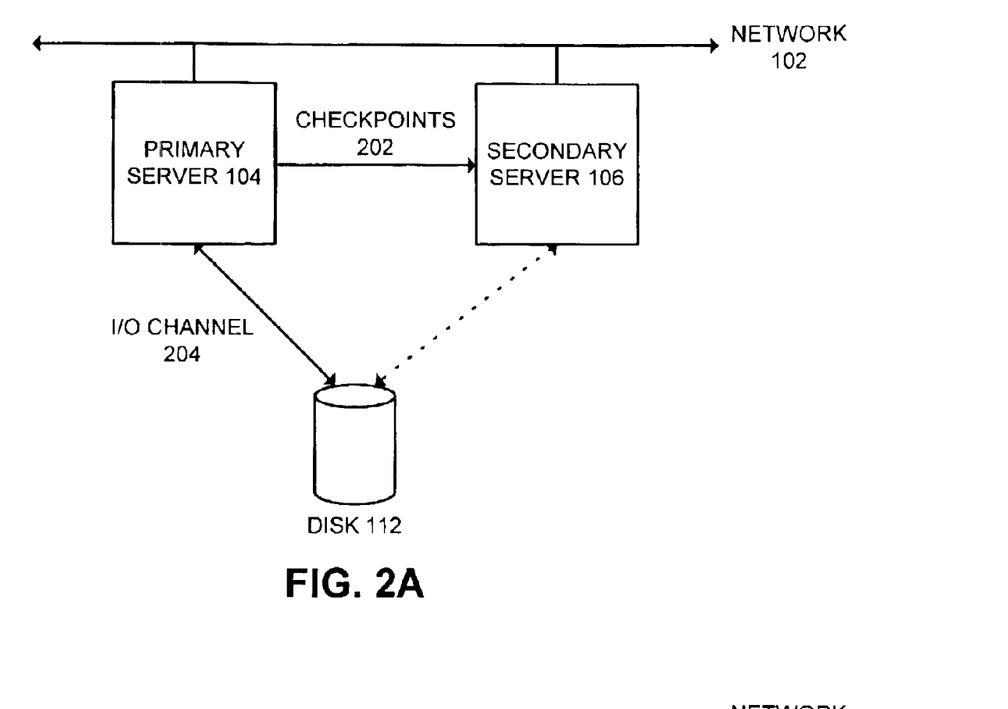
FIG. 2A illustrates the process of checkpointing in a highly available file system in accordance with an embodiment of the present invention.

FIG. 2A illustrates the process of checkpointing in a highly available file system in accordance with an embodiment of the present invention. During operation, primary server 104 receives a file access request from network 102 and accesses disk 112 through I/O channel 204 to respond to this request.

Primary server 104 periodically sends checkpoints 202 to secondary server 106 so that secondary server 106 can maintain data related to file operations in progress on primary server 104. If primary server 104 fails, secondary server 106 makes use of the data provided in checkpoints 202 to become a new primary server.

Failure of Primary Server

Figure 2B:
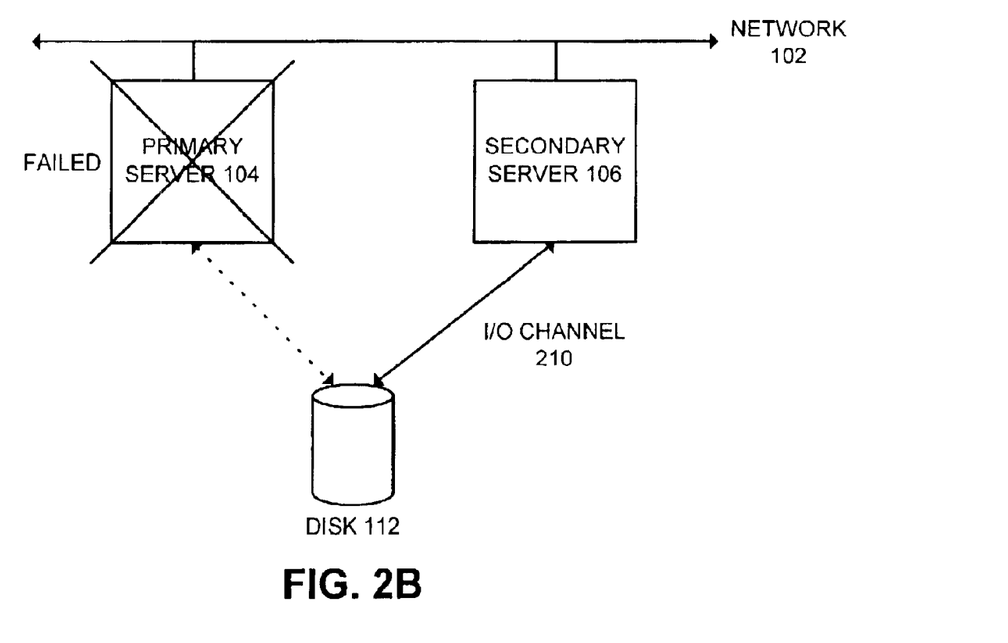
FIG. 2B illustrates a failed primary file server in a highly available file system in accordance with an embodiment of the present invention.

In FIG. 2B, primary server 104 has failed and secondary server 106 has been promoted to be a new primary. Upon being promoted to be a new primary server, secondary server 106 converts FIDs associated with locks into vnodes and then retries uncompleted file operations if necessary. FIDs not associated with locks are not converted into vnodes until a subsequent access to the file occurs. Note that secondary server 106 communicates with disk 112 across I/O channel 210.

Data Structures

Figure 3:
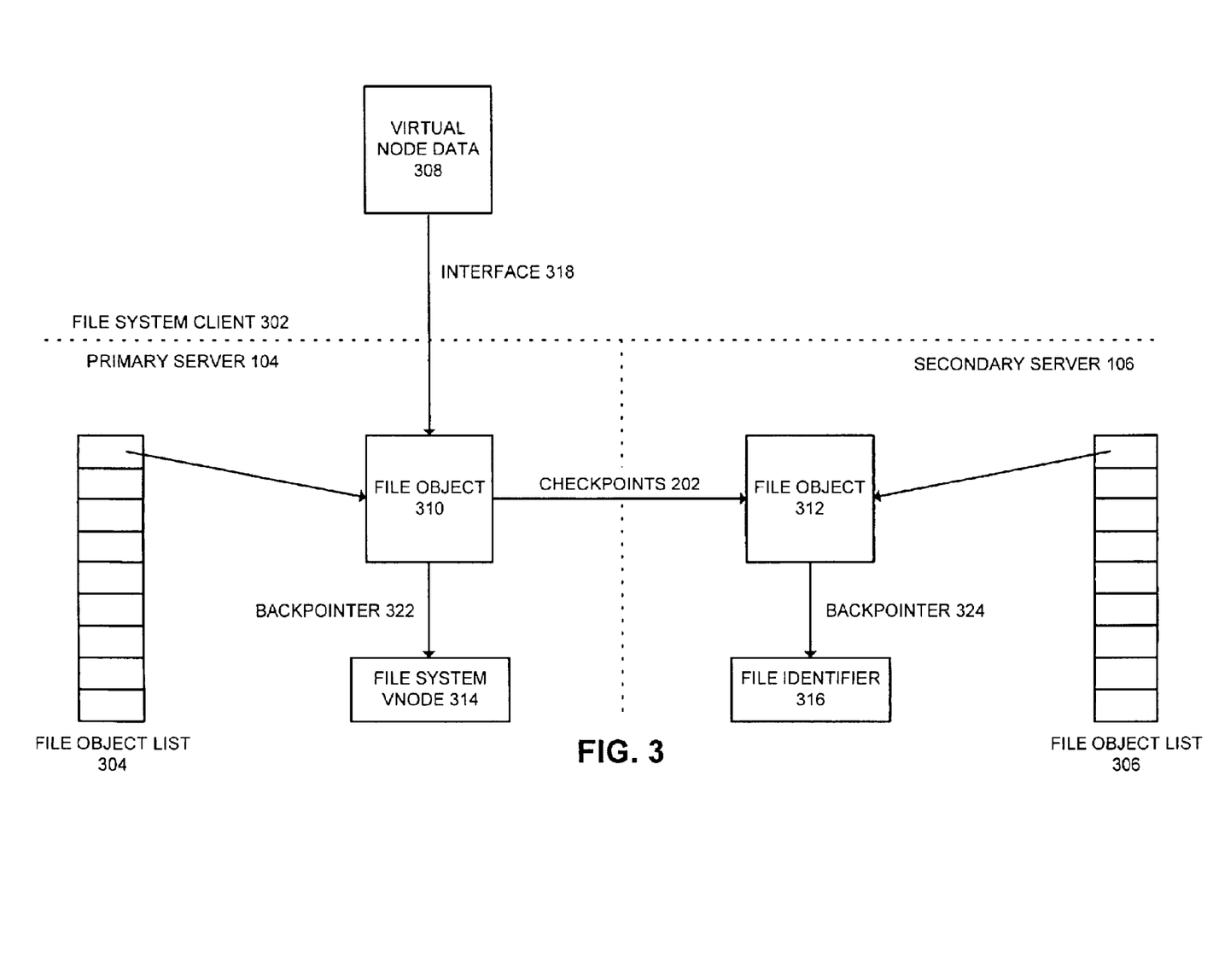
FIG. 3 illustrates a number of data structures within a highly available file system in accordance with an embodiment of the present invention.

FIG. 3 illustrates a number of data structures within a highly available file system in accordance with an embodiment of the present invention. Note that FIG. 3 includes portions of file system client 302, primary server 104, and secondary server 106. File system client 302 includes virtual node data 308 related to a file within the highly available file system. File system client 302 receives data from the associated file and updates the associated file through interface 318. Interface 318 accesses file object 310 within primary server 104. File object 310, in turn, accesses file system vnode 314 using backpointer 322 within file object 310. Note that file object list 304 includes a pointer to every file object on primary server 104, including file object 310.

Primary server 104 sends checkpoints 202 to secondary server 106. Secondary server 106 uses checkpoints 202 to maintain file object 312. Note that file object 312 is substantially the same as file object 310 except that backpointer 324 within file object 312 points to file identifier 316 rather than a vnode. File object list 306 includes a pointer to each file object within secondary server 106.

File Object

Figure 4:
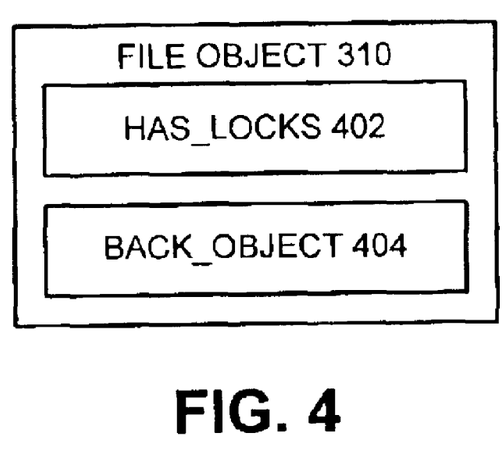
FIG. 4 illustrates file object 310 in accordance with an embodiment of the present invention.

FIG. 4 illustrates file object 310 in accordance with an embodiment of the present invention. File object 310 includes has_locks 402 and back_object 404. Has_locks 402 is a Boolean variable indicating whether the related file has been locked by an application. Typically, open files are locked only when an update operation is in progress, therefore, has_locks 402 is typically false. Back_object 404 is a pointer pointing to the file system vnode 314. The respective back_object pointer in file object 312 points to file identifier 316. Note that the has_locks Boolean variable within file object 312 has the same state as the has_locks Boolean variable 402 within file object 310.

Converting a Secondary Server

Figure 5:
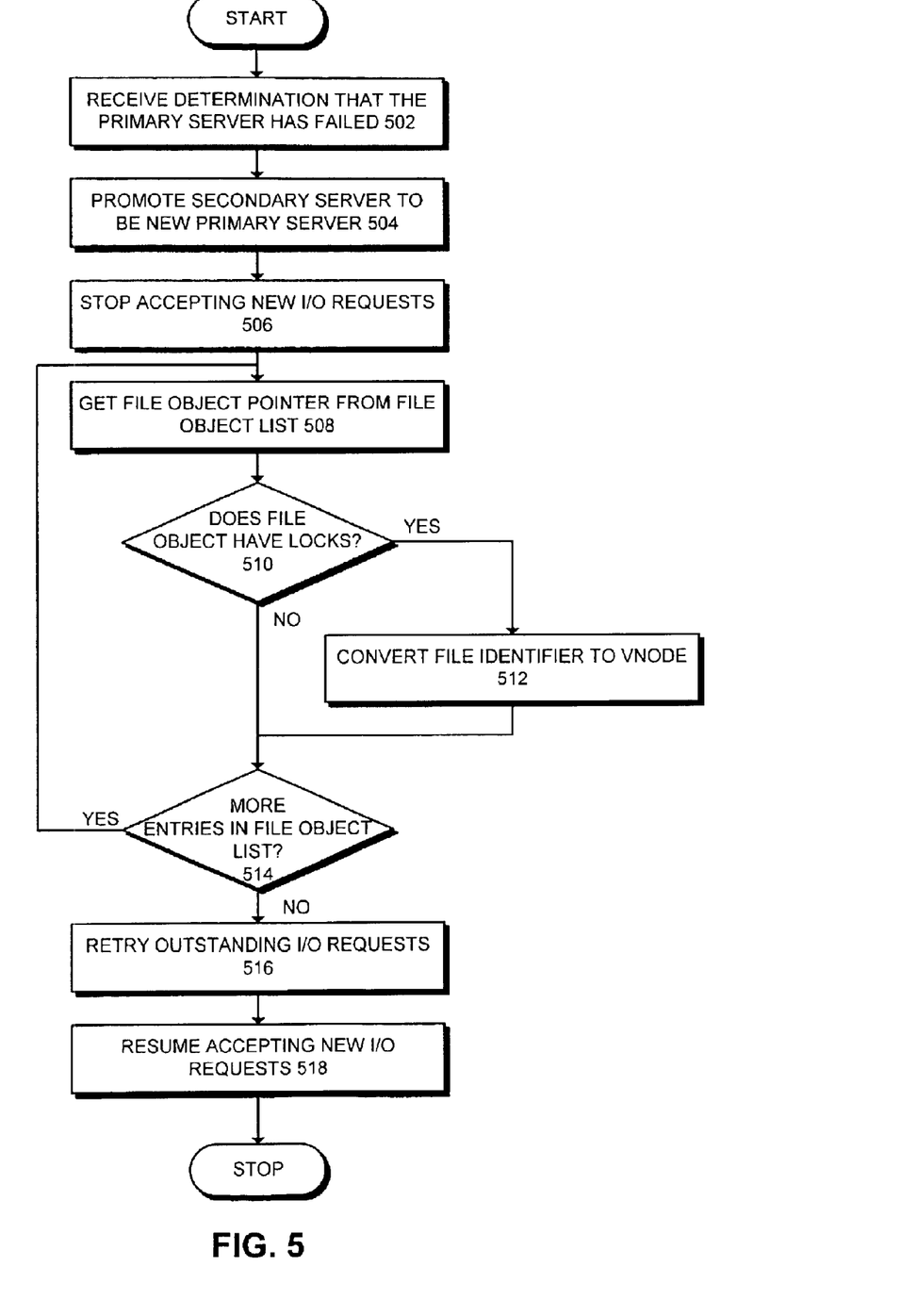
FIG. 5 is a flowchart illustrating the process of promoting a secondary file server to be a new primary file server in accordance with an embodiment of the present invention.

FIG. 5 is a flowchart illustrating the process of promoting a secondary file server to be a new primary file server in accordance with an embodiment of the present invention. The system starts when secondary server 106 determines that primary server 104 has failed (step 502). In response to this determination, secondary server 106 is promoted to be a new primary server (step 504). During this process, the new primary server stops accepting new I/O requests (step 506).

After stopping the new I/O requests, the new primary server inspects the file objects in a loop to determine which files have their has_locks Boolean variables set to true. The first action in the loop is to get a file pointer from the file object list (step 508). Next, the new primary server determines if the has_locks Boolean variable is true (step 510). If so, the file identifier converter converts the file identifier to a vnode (step 512). Note that converting the file identifier involves accessing the disk to read the file. After this conversion, or if the has_locks Boolean is false, the new primary server determines if there are more pointers in the file object list (step 514). If so, the process returns to step 508 to retrieve the next file object pointer. Note that the new file server converts only files with has_locks Boolean variables set to true, which can save a considerable amount of time during the failover process.

After scanning the entire file object list, the new primary file server retries any outstanding I/O requests (step 516). Finally, the new primary file server resumes accepting new I/O requests (step 518).

Converting Unconverted FIDs

Figure 6:
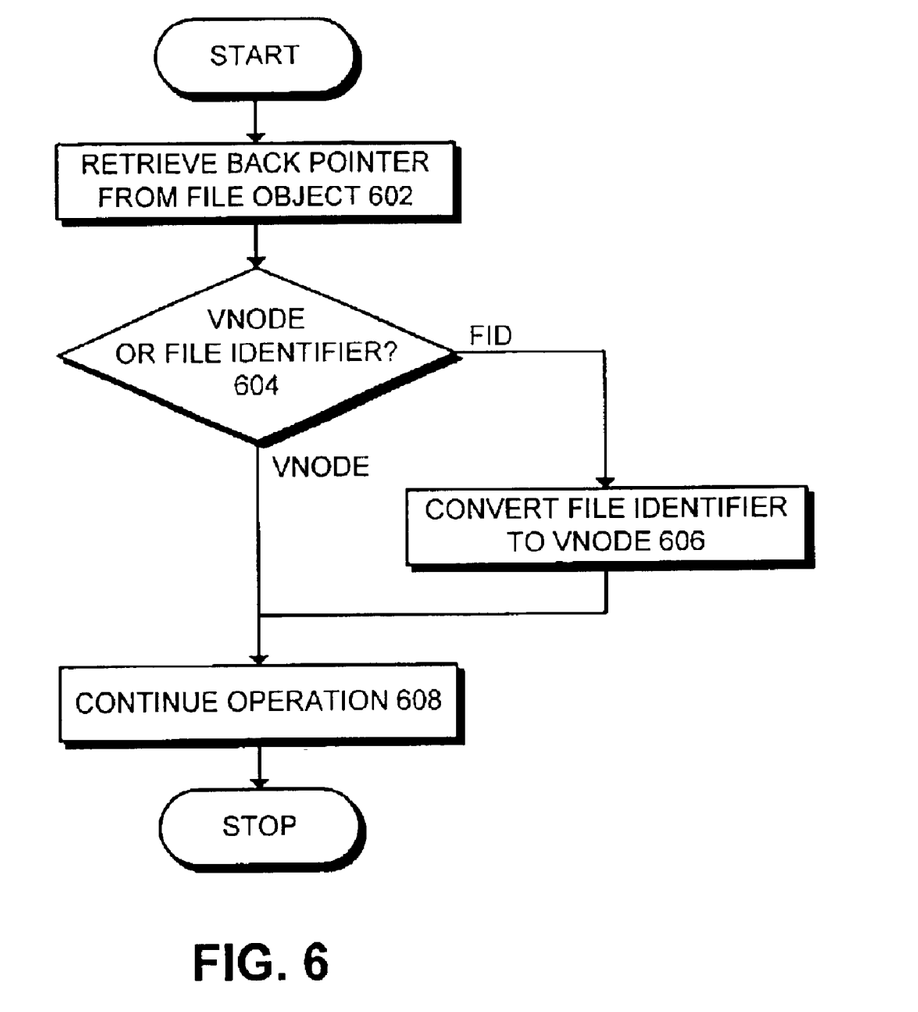
FIG. 6 is a flowchart illustrating the process of converting a file identifier into a vnode in accordance with an embodiment of the present invention.

FIG. 6 is a flowchart illustrating the process of converting a file identifier into a vnode in accordance with an embodiment of the present invention. This process takes place the first time a file is accessed by a new primary file server after a failover. During this first access, the primary file server retrieves a back pointer from a file object associated with the file (step 602). Next, the primary file server determines if the back pointer points to a vnode or to an FID (step 604). If the back pointer points to an FID, the primary file server converts the FID into a vnode (step 606). After the vnode is created, the system resumes operation (step 608).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for elevating a secondary file server to act as a new primary file server in a highly available file system, comprising:

determining that a primary file server in the highly available file system has failed, wherein the primary file server accesses files through virtual nodes;

promoting the secondary file server to become the new primary file server, wherein the secondary file server maintains a file identifier for each file maintained by the primary file server;

scanning a list of file objects on the primary file server looking for a file lock indication;

upon finding a file lock indication, converting an associated file identifier into a virtual node; and delaying conversion of file identifiers to virtual nodes for file objects without a file lock indication;

whereby delaying conversion of file identifiers speeds up the promotion process.

2. The method of claim 1, wherein the file lock indication is stored within a file object referenced by the list of file objects.

3. The method of claim 2, further comprising converting a file identifier into a corresponding virtual node during a first access to the file object by the new primary file server.

4. The method of claim 1, wherein converting the associated file identifier into the virtual node involves locating a file referenced by the associated file identifier and reading the file.

5. The method of claim 1, further comprising periodically sending a checkpoint from the primary file server to the secondary file server.

6. The method of claim 5, wherein the checkpoint includes the file identifier associated with the virtual node.

7. The method of claim 5, wherein a checkpoint is sent for each state change at the primary file server.

8. A computer-readable storage medium storing instructions that when executed by a computer cause the computer to perform a method for elevating a secondary file server to act as a new primary file server in a highly available file system, the method comprising:

determining that a primary file server in the highly available file system has failed, wherein the primary file server accesses files through virtual nodes;

promoting the secondary file server to become the new primary file server, wherein the secondary file server maintains a file identifier for each file maintained by the primary file server;

scanning a list of file objects on the primary file server looking for a file lock indication;

upon finding a file lock indication, converting an associated file identifier into a virtual node; and delaying conversion of file identifiers to virtual nodes for file objects without a file lock indication;

whereby delaying conversion of file identifiers speeds up the promotion process.

9. The computer-readable storage medium of claim 8, wherein the file lock indication is stored within a file object referenced by the list of file objects.

10. The computer-readable storage medium of claim 9, the method further comprising converting a file identifier into a corresponding virtual node during a subsequent access to the file object by the new primary file server.

11. The computer-readable storage medium of claim 8, wherein converting the associated file identifier into the virtual node involves locating a file referenced by the associated file identifier and reading the file.

12. The computer-readable storage medium of claim 8, the method further comprising periodically sending a checkpoint from the new primary file server to the secondary file server.

13. The computer-readable storage medium of claim 12, wherein the checkpoint includes the file identifier associated with the virtual node.

14. The computer-readable storage medium of claim 12, wherein a checkpoint is sent for each state change at the new primary file server.

15. An apparatus for elevating a secondary file server to act as a new primary file server in a highly available file system, comprising:

a failure determining mechanism that is configured to determine that a primary file server in the highly available file system has failed, wherein the primary file server accesses files through virtual nodes;

a promoting mechanism that is configured to promote the secondary file server to become the new primary file server, wherein the secondary file server maintains a file identifier for each file maintained by the primary file server;

a scanning mechanism that is configured to scan a list of file objects on the primary file server looking for a file lock indication;

a converting mechanism that is configured to convert an associated file identifier into a virtual node upon finding a file lock indication; and a delaying mechanism that is configured to delay conversion of file identifiers to virtual nodes for file objects without the file lock indication.

16. The apparatus of claim 15, wherein the file lock indication is stored within a file object referenced by the list of file objects.

17. The apparatus of claim 16, wherein the converting mechanism is further configured to convert a file identifier into a corresponding virtual node during a subsequent access to the file object by the new primary file server.

18. The apparatus of claim 15, wherein converting the associated file identifier into the virtual node involves locating a file referenced by the associated file identifier and reading the file.

19. The apparatus of claim 15, a sending mechanism that is configured to periodically send a checkpoint from the new primary file server to the secondary file server.

20. The apparatus of claim 19, wherein the checkpoint includes the file identifier associated with the virtual node.

21. The apparatus of claim 19, wherein a checkpoint is sent for each state change at the new primary file server.

* * * * *